United States Patent [19]

Ikenoue et al.

[11] 4,356,541
[45] Oct. 26, 1982

[54] RECTIFIER

[75] Inventors: Tsuneo Ikenoue, 14-6, Ichiban-cho 1-chome, Sendai-shi, Miyagi; Shin-yng Liu, Sendai; Shuichi Umemoto, Yokohama; Naoki Arai, Machida, all of Japan

[73] Assignees: Tsuneo Ikenoue; Tohoku Ricoh Co. Ltd.; Stanley Electric Co., Ltd.; Micron Kiki Co., Ltd., all of Tokyo, Japan

[21] Appl. No.: 216,923

[22] Filed: Dec. 16, 1980

[30] Foreign Application Priority Data

Dec. 19, 1979 [JP] Japan .............................. 54-165011

[51] Int. Cl.³ .......................................... H02M 3/335
[52] U.S. Cl. ....................................... 363/20; 363/53; 363/126; 363/127
[58] Field of Search ..................... 363/20, 21, 53, 126, 363/127, 89; 323/271, 272, 282–290, 351

[56] References Cited

U.S. PATENT DOCUMENTS

| | | | |
|---|---|---|---|
| 3,735,235 | 5/1973 | Hamilton et al. | 323/289 |
| 3,909,700 | 9/1975 | Ferro | 363/127 |
| 3,940,682 | 2/1976 | Park et al. | 363/127 |
| 4,189,764 | 2/1980 | Snyder | 363/21 |

OTHER PUBLICATIONS

IBM Technical Disclosure Bulletin, vol. 13, No. 5, p. 1393, Oct. 1970.

*Primary Examiner*—William H. Beha, Jr.
*Attorney, Agent, or Firm*—Burgess, Ryan and Wayne

[57] ABSTRACT

A rectifier in which a semiconductor active element, which is a rectifying element, and a diode are connected in parallel in the same direction so that the degradation in rectifying efficiency due to the delay in rise time of voltage when the active element is turned on can be avoided.

3 Claims, 7 Drawing Figures

PRIOR ART

RECTIFIER

BACKGROUND OF THE INVENTION

The present invention relates to a rectifier of the type in which a semiconductor active element such as a transistor is used as a rectifying element.

In general, rectification losses are dependent upon the characters or properties of not only rectifying elements themselves but also their associated circuits. The characteristics or properties of the rectifying elements which will affect the rectification losses are divided in general into the static or steady-state characteristics or properties such as the forward voltage drop, reverse current and so on and the transient characteristics or properties observed during a turn-on time and a turn-off time. The circuit characteristics or properties mainly cause high-frequency losses. Especially when the output voltage of a rectifier is low, the forward voltage drop will adversely affect the rectification efficiency. When the reverse recovery time, which is one of the transient characteristics or properties, becomes comparable with the period of the input voltage, its effects on the rectification efficiency will not remain negligible. As a consequence, when the input voltage or current rapidly changes in level at high frequencies as does a rectangular voltage or current, the adverse effects due to the transient characteristics or properties of a rectifying element used must be taken into consideration.

In the case of a rectifier which rectifies a current at a low frequency and especially at a low voltage such as a commercial power supply, the only requirement for attaining a high rectification efficiency is that the forward voltage drop is low. As a result, germanium diodes and Schottky barrier type diodes are widely used. In the case of the rectification of the high-frequency input current, the transient characteristics must be taken into consideration so that the Schottky barrier type diodes and fast-recovery diodes are used. However, rectifying elements with a reverse recovery time of less than 50 ns are not available at present so that it is extremely difficult to attain satisfactorily high efficiency at high frequencies. With respect to the forward voltage drop and the turn-off characteristics, the Schottky barrier type diodes are advantageous over the fast-recovery type diodes, but the former have a low breakdown voltage so that they can be used only when the input voltage is low. The forward voltage drop of these rectifying elements is in general of the order of 0.5 V at their maximum rated current. Even when they are used at 1/10 or 1/100 of the maximum rated current, the forward voltage drop is higher than 0.25 or 0.2 V, respectively. Because of the above-described characteristics of these rectifying elements, the rectification efficiency of the rectifiers and especially those operating at high frequencies is limited.

Mechanical rectifiers have been used as the power rectifiers for rectifying the voltages at relatively low frequencies such as a commercial frequency. Since a set of contacts is used, the mechanical rectifiers are advantageous over the semiconductor rectifying elements in that the forward voltage drop is less, but it is difficult to synchronize the closing and opening of the contacts with the zero crossing of an AC voltage so that the operation is not stable especially at high frequencies. Thus, the mechanical rectifiers operating at high frequencies are not satisfactory in practice.

In the phase detectors (such as the phase discriminators, phase sensitive amplifiers, or lock-in amplifiers) used in communications equipment and measuring instruments, there have been used synchronized rectifiers utilizing the field-effect transistors or bipolar transistors and the combinations of synchronized circuits and amplifiers. However, synchronized rectifiers utilizing the semiconductor active elements have not been used as power rectifiers. It may be considered that the use of field-effect transistors and bipolar transistors as the rectifying elements is advantageous or optimum, because they have a low forward voltage drop, a high reverse resistance and excellent transient characteristics. However, in practice, when they are utilized in the synchronized power rectifiers, it is difficult to achieve a desired phase relationship between the input voltage and the control voltage because the load current, load resistance and load impedance are not necessarily maintained uniform. Especially, when the load is of the type having a capacitance or producing the counter electromotive force, the rectified current flows due to the instantaneous difference between the input and load voltages so that an excessive reverse current flows into or an excessive overvoltage is applied to a semiconductor active element which is turned on. As a result, the active element is damaged. In the case of a circuit with a high interior impedance such as a phase detector for discriminating the phase by utilizing the reverse current which flows when the semiconductor active element is turned on, the active element can be utilized as a rectifying element in a relatively simple manner, but it is very difficult to utilize the semiconductor active elements as the rectifying elements in the power rectifiers in order to attain a higher degree of efficiency.

SUMMARY OF THE INVENTION

The present invention was made to overcome the above and other problems encountered in the prior art synchronized rectifiers and has for its object to provide a rectifier in which a semiconductor active element is used as a rectifying element so that the rectifier can operate at high frequencies with a higher degree of efficiency.

According to the present invention, an active element such as a transistor is used as a rectifying element and a diode is connected in parallel with the active element in the same direction so that the diode can flow the current during the turn-on time of the active element, whereby the need for attaining the exact synchronization between a control voltage and the output voltage of the active element can be eliminated.

More specifically, the rectifier in accordance with the present invention is featured in that a semiconductor active element is used as a rectifying element; a diode is connected in parallel with the active element in the same direction; a terminal voltage comparator is coupled to the parallel combination of the active element and the diode so as to detect the voltage difference across the parallel combination; and a pulse control circuit for controlling the semiconductor active element in response to the output from the terminal voltage comparator and timed pulses is coupled to the control terminal of the semiconductor active element so that the trailing edge of the control pulse being applied thereto can be suitably timed.

BRIEF DESCRIPTION OF THE DRAWINGS

Same reference numerals are used to designate similar parts throughout the figures.

DETAILED DESCRIPTION OF THE PRIOR ART

Figure 1:
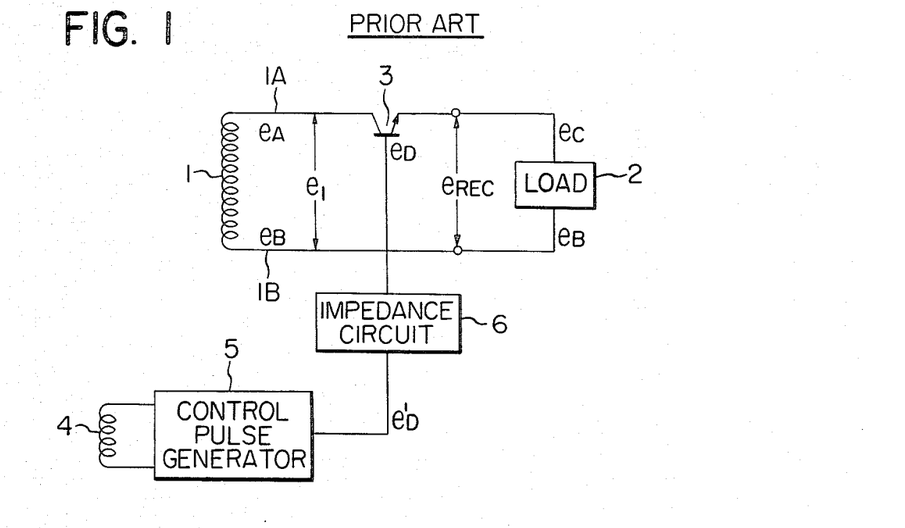
FIG. 1 is a block diagram of a prior art rectifier.
Figure 2:
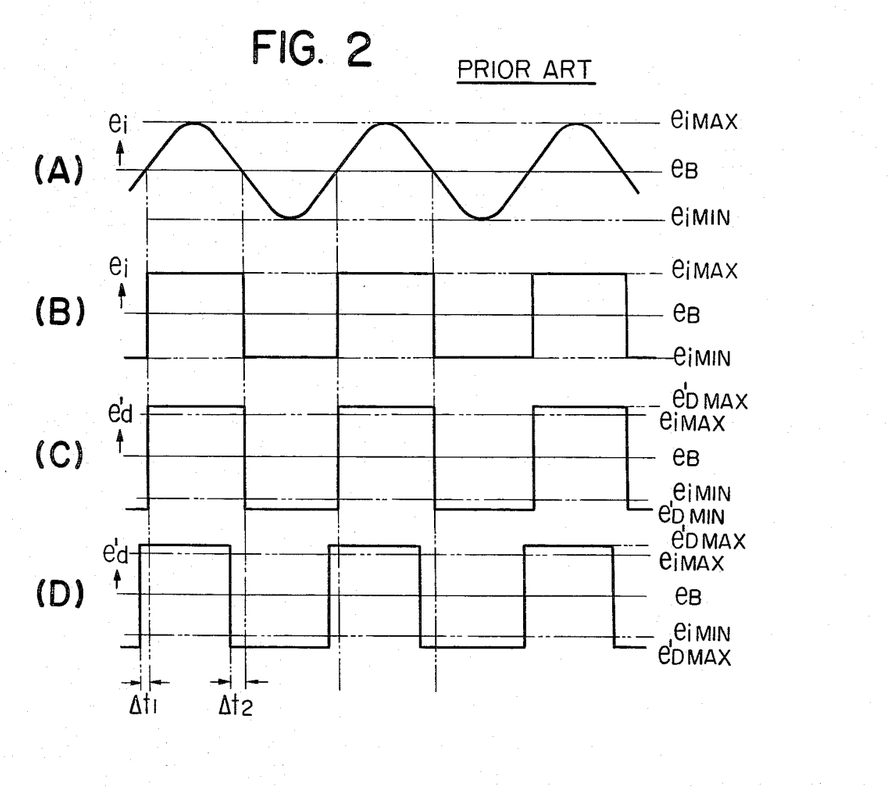
FIG. 2 is a timing chart used for the explanation of the mode of operation thereof.
Figure 3:
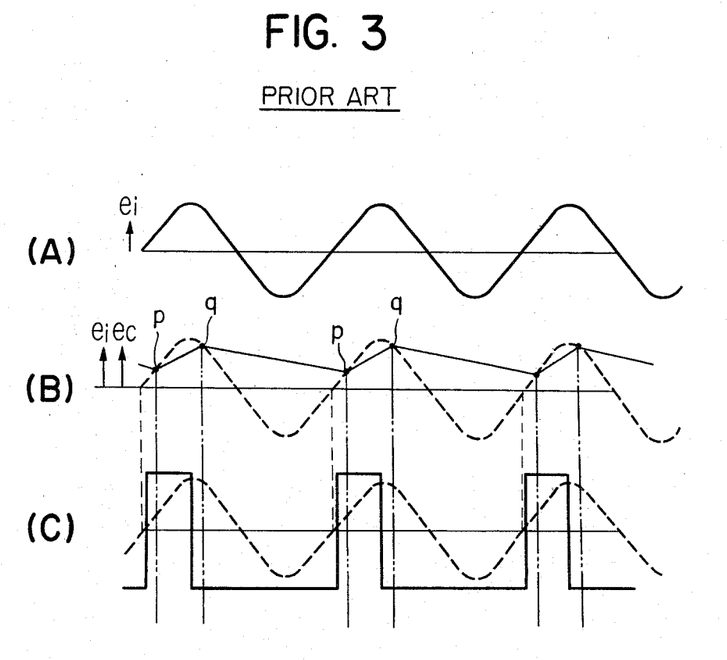
FIG. 3 is a timing chart used for the explanation of the desired operation of the rectifier shown in FIG. 1 and the rectifiers in accordance with the present invention.

FIGS. 1, 2 and 3

Referring to FIGS. 1 through 3, the reason why the use of the active elements as rectifying elements give rise to the above-described difficulties will be described in more detail. FIG. 1 shows a synchronized rectifier constructed by utilizing a semiconductive active element such as an NPN type transistor instead of a diode in a conventional half-wave rectifier. The positive terminal 1A of a secondary coil 1 of a main transformer, which is an input source, is connected through the collector and emitter of an NPN transistor 3, which is a rectifying element, to a load 2, and the negative terminal 1B of the secondary coil 1 is directly connected to the load 2. A transformer 4, which derives a suitable control voltage from the input voltage, is connected to a control pulse generator 5 which generates the control pulses which in turn are applied to the transistor 3. More specifically, the output terminal of the control pulse generator 5 is connected to the base of the transistor 3 through an impedance circuit 6 which adjusts the drive current applied to the base.

The input voltage $e_i$ is expressed by $$e_i = e_A - e_B$$

where $e_A$: the potential at the terminal 1A; that is, the input terminal of the secondary coil 1;

$e_B$: the potential at the terminal 1B; that is, the input terminal of the secondary coil 1.

The rectifier output voltage $e_{REC}$ is expressed by $$e_{REC} = e_c - e_B$$

where $e_c$: the output terminal voltage; that is, the voltage applied to the positive terminal of the load 2. When the transistor 3 is driven into the saturation, the collector-emitter voltage $V_{CE}(=e_A-e_C)$ is extremely small so that $$V_{CE} = e_A - e_C < e_D - e_C$$

where $e_D$: the base voltage of the transistor 3. Therefore, $$e_D > e_A$$

In order to quickly cut off the transistor 3 by applying a sufficient reverse current to the base, the control pulse generator 5 must be such that its output voltage; that is, the base voltage $e_D$ is lower than the output terminal voltages $e_A$ and $e_C$.

If the input voltage $e_i$ has a sinusoidal waveform as shown at (A) in FIG. 2 or a rectangular waveform as shown at (B) in FIG. 2, if the load 2 consists of a pure resistance, when the transistor 3 has a high transition response, and when the output $e'_D$ of the control pulse generator 5 has a maximum value $e'_{D\,max}$ higher than the maximum value $e_{i\,max}$ of the input voltage $e_i$ and a minimum value $e'_{D\,min}$ lower than the minimum value $e_{i\,min}$ of the input voltage $e_i$ and has a rectangular waveform synchronized with the input voltage $e_i$, then it becomes possible to attain the synchronized rectification without any loss. However, the collector current does not immediately respond to the input voltage; that is, the transistor has a turn-on time $t_{on}$ (the sum of the delay time $t_d$ and the rise time $t_r$) and the turn-off time $t_{off}$ (the sum of the storage time $t_s$ and the fall time $t_f$). It follows, therefore, that in order to eliminate losses, as shown at (D) in FIG. 2, the output voltage from the control pulse generator 5 must rise and fall, and furthermore, must be advanced in time by $\Delta t_1$ and $\Delta t_2$ relative to the waveform shown at (C). With the voltage waveform as shown at (C), the rise of the input voltage $e_i$ is delayed by the turn-on time $t_{on}$ of the transistor 3 so that the current efficiency drops. Because of the turn-off time $t_{off}$, the reverse current flows from the load 2 to the transistor 3 so that the rectification efficiency drops and the degradation results. When the load 2 has a capacitance and if the input voltage $e_i$ has not a regular rectangular waveform and changes from time to time as shown at (A) or has distorted waveforms and if the transistor 3 is driven with the control pulses as shown at (C) or (D), the reverse current flows into the transistor 3 when the latter is conducted. As a result, the transistor 3 will be damaged as will be described in detail below.

Referring to FIG. 3, the solid curve at (A) and the broken line curves at (B) and (C) denote the input voltage $e_i$. The solid-line curve at (B) shows the load voltage; that is, the rectifier output voltage $e_c$ when the load has a capacitance and the rectifying element is a diode. The points p and q at (B) shows the equipotential points at which the load voltage $e_c$ and the input voltage $e_i$ cross with each; that is, the points at which $e_i = e_c$. When $e_i > e_c$; that is, from the time point p to the point q, the output current flows into the load. Same is true when the transistor 3 or the active element is used instead of the diode as shown in FIG. 1. If the transistor 3 is driven with the control pulses as shown at (B) or (C), it remains conducted for a time interval except the time interval from p to q; that is, when $e_i < e_c$ and under this condition the reverse current flows into the transistor 3 because of the voltage $e_c$, so that the transistor 3 will be damaged and the rectification efficiency will drop to a considerable degree. Therefore, it follows that with the semiconductive active elements such as transistors, they must be correctly turned on and off at the time points p and q. Furthermore, when the turn-on and turn-off time of the transistor are taken into consideration, the control pulses must be so timed that they rise and fall slightly before the time points p and q, respectively. However, these equipotential points p and q vary from time to time depending upon the input voltage, waveform and frequency and on the load (its capacitance and the load current). As a result, it is extremely difficult and next to impossible in practice to design and construct the control pulse generator 5 which, in response to the input voltage, generates the control pulses in response to which the transistor 3 is turned on and off in synchronism with the equipotential points p and q.

DESCRIPTION OF THE PREFERRED EMBODIMENTS

Figure 4:
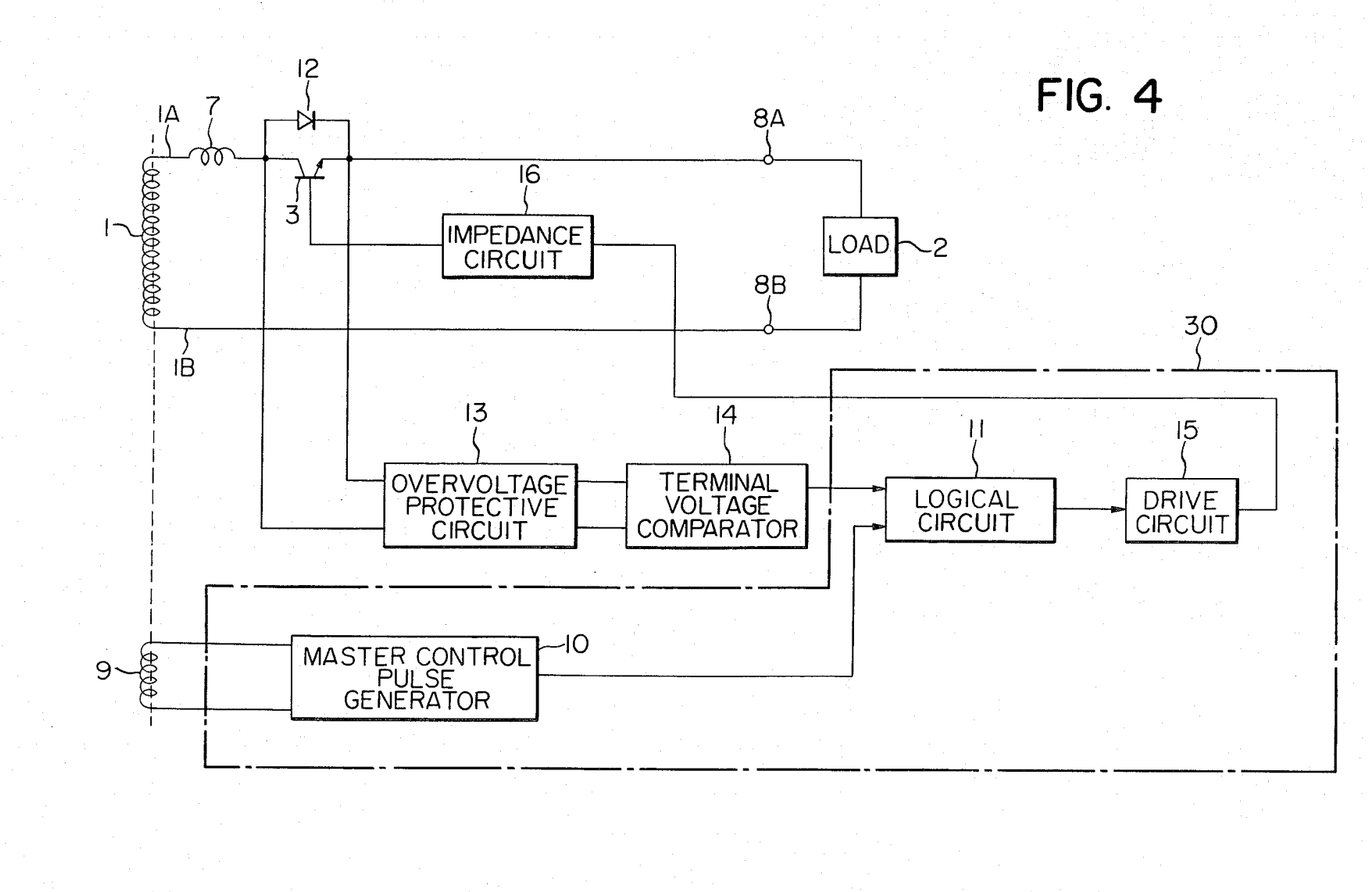
FIG. 4 is a block diagram of a first embodiment of a rectifier in accordance with the present invention.

First Embodiment, FIG. 4

The positive terminal 1A of the secondary coil 1 of the main transformer or input power source is connected through an inductor 7 having a very small inductance is connected to the collector of an NPN transistor 3, which is a semiconductor active element, and the collector is connected to the positive output terminal 8A which in turn is connected to one end of the load 2. The negative terminal 1B of the secondary coil 1 is connected to the negative output terminal 8B which in turn is connected to the other end of the load 2. A master control pulse source 9 which derives a master control pulse voltage in synchronism with the input voltage is connected to a main control pulse generator 10 which converts the output from the source 9 into a rectangular waveform and generates the master control pulses synchronized with the input voltage. The master control pulse generator 10 in turn is coupled to one input terminal of a logic circuit 11 which may be an AND or OR gate. The master pulse control generator 10 receives as an input the output from the secondary 9 of the input transformer 1, detects the polarity of the input voltage and reshapes it into a rectangular waveform. An auxiliary and small diode 12 is connected in parallel between the collector and emitter of the transistor 3 and in the forward direction. The anode and cathode of the diode 12 are connected through an overvoltage protective circuit 13 to a terminal voltage comparator 14 which in turn is coupled to the other input terminal of the logic circuit 11. The output of the logic circuit 11 is connected to a drive circuit 15 the output of which in turn is coupled through a series-connected impedance circuit 16 to the base of the transistor 3. The master control pulse generator 10, the logic circuit 11 and the drive circuit 15 constitute a pulse control circuit 30 which controls the rectifying transistor 3 with the pulses in response to the output from the terminal voltage comparator 14.

The terminal voltage comparator 14 detects the equipotential point p at which the rising input voltage $e_i$ becomes equal to the output voltage $e_c$ and the equipotential point q at which the falling input voltage $e_i$ becomes equal to the output voltage $e_c$ and generates the control pulse the polarity of which causes the transistor 3 to turn on. This control pulse is applied to the other input terminal of the logic circuit 11 which is an AND or OR gate. The ENABLE pulse which causes the transistor 3 to turn on is applied to one input terminal of the logic circuit 11 during the time interval when the input voltage $e_i$ is positive. As a result, the logic circuit 11 generatets the pulse output the polarity of which enables the transistor 3 between p and q. The output pulse from the logic circuit 11 is applied to the drive circuit 15 which in turn applies the drive pulse to the base of the transistor 3 so that the latter is turned on. Therefore, the transistor 3 is turned on at the point p when the input voltage $e_i$ is rising and turned off at the point q when the input voltage $e_i$ is falling. However, in practice, the transistor 3 has the turn-on time $t_{on}$ and the turn-off time $t_{off}$ so that the transistor 3 is turned on a little time latter than the point p and tuned off a little time latter than the point q. The inductor 7 has a function of blocking the transient flow of reverse current into the transistor 3 from the point q to the time when the transistor 3 is completely turned off; that is, during the turn-off time. The diode 12 has a function of rectifying the input voltage $e_i$ during the turn-on time $t_{on}$ of the transistor 3 so that the delay of the output from the parallel combination can be shortened and the output from the parallel combination can be synchronized with the load voltage.

In summary, according to the first embodiment of the present invention, the voltage between the collector and emitter of the transistor 3, which is a rectifying element, is detected so as to detect the points p and q. The drive pulse synchronized with these points p and q is generated so as to drive the transistor 3. The inductor 7 is connected in series to the transistor 3 so that the damages to and degradation of the transistor 3 and the diode 12 due to the transient current and reverse current can be avoided so that the stabilized operation of the rectifier is ensured. Thus, the present invention provides a high-efficiency rectifier utilizing a transistor as a rectifying element.

The diode 12 operates for a short time during the turn-on time of the transistor 3 so that the degradation in rectifying efficiency due to the delay in rise time of voltage when the active element is turned on can be avoided. In the first embodiment, the inductor 7 having a very small inductance is inserted separately, but since the main function of the inductor 7 is to prevent the rapid current variation, any available inductance such as a leakage inductance from the transformer may be used as in the second embodiment to be described with reference to FIG. 5.

Figure 5:
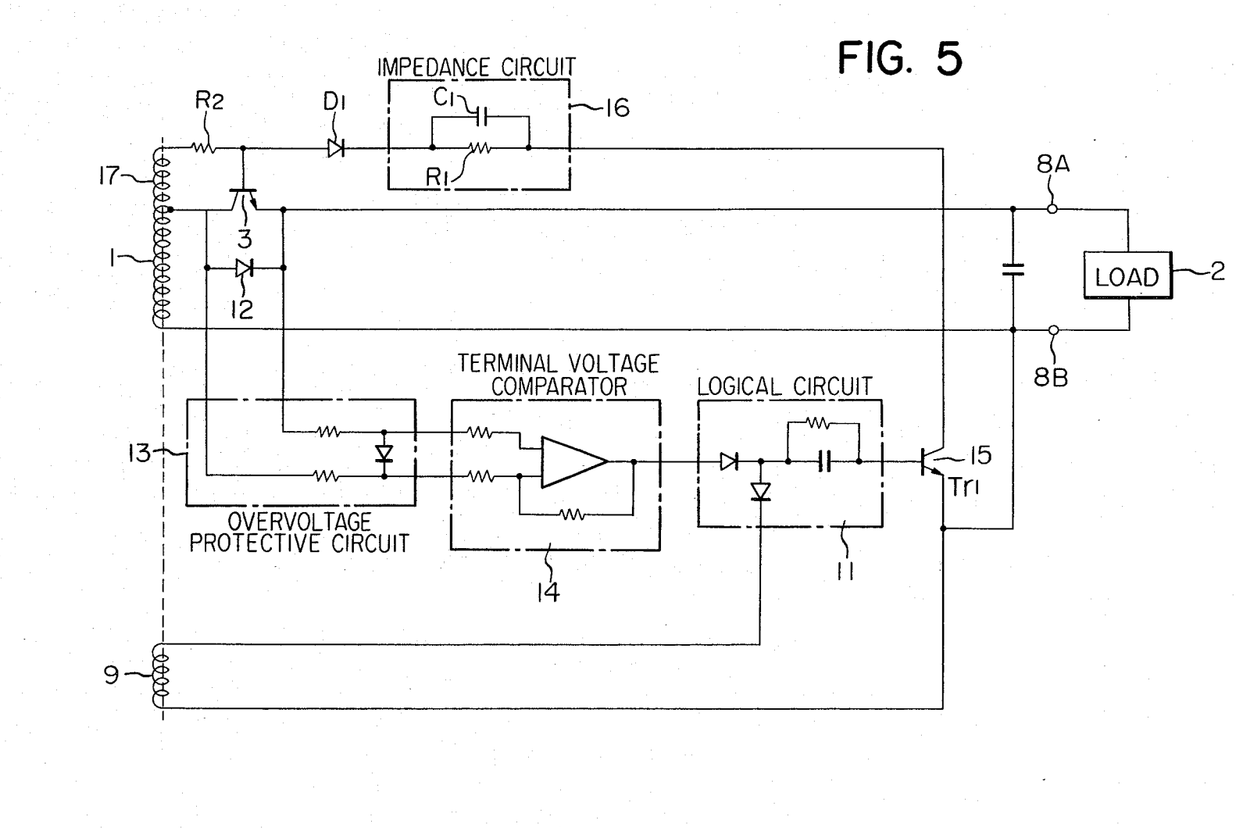
FIG. 5 is a block diagram of a second embodiment of the present invention.

Second Embodiment, FIG. 5

The second embodiment shown in FIG. 5 is substantially similar in construction except that a coil 17 is connected to the secondary coil 1 of the main transformer so that the power derived across the coil 17 is used as the base power for driving the transistor 3. The coil 17 is connected through a resistor $R_2$, a diode $D_1$ and an impedance circuit 16 consisting of parallel-connected resistor $R_1$ and a capacitor $C_1$ to the collector of a transistor $T_{r1}$ which corresponds to the drive circuit 15 in FIG. 4. The junction between the resistor $R_2$ and the diode $D_1$ is connected to the base of the transistor 3 which is a rectifying element. Except the above-described arrangement, the diode 12, the overvoltage protective circuit 13, the terminal voltage comparator 14, and the logic circuit 11, which are all shown in detail as compared with FIG. 1, are substantially similar in construction and mode of operation so that no further description of them shall not be made.

Next, the mode of operation of the second embodiment will be briefly described. When the transistor $T_{r1}$ is turned off, the base voltage of the transistor 3 rises, but when the former is turned on the base voltage drops so that the transistor 3 is turned off. The results of the experiments conducted by the inventors confirmed the fact that when the voltage across the coil 17 and the value of the resistor $R_2$ are suitably selected, the loss due to the insertion of the resistor $R_2$ can be reduced to a minimum and a higher degree of efficiency can be ensured.

Figure 6:
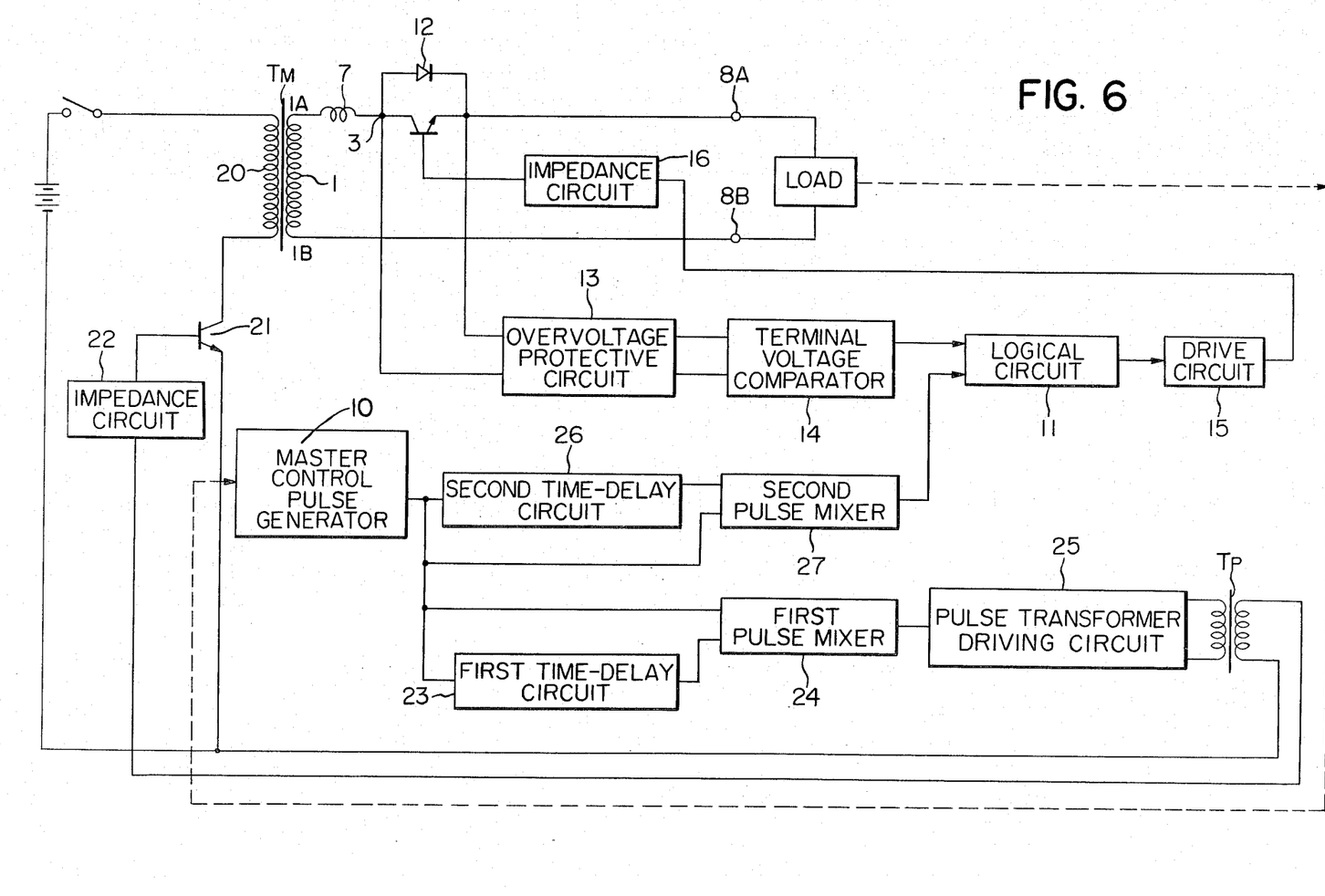
FIG. 6 is a block diagram of a third embodiment of the present invention applied to a transformer isolated forward type DC-DC converter.
Figure 7:
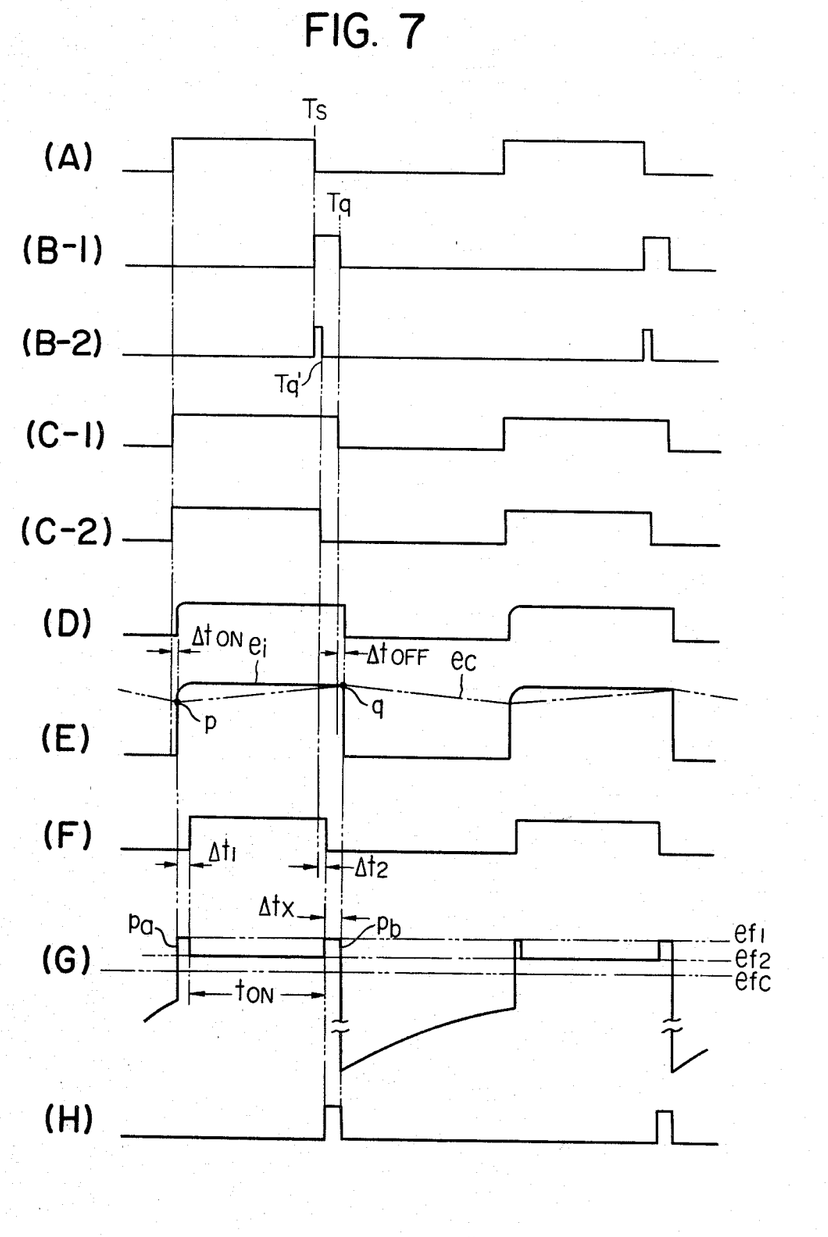
FIG. 7 is a timing chart used for the explanation of the mode of operation of the third embodiment (when applied to a forward type DC-DC converter).

Third Embodiment, FIGS. 6 and 7

The third embodiment of the present invention is applied to a rectifier on the secondary coil side of a transformer in a transformer isolation type DC-DC converter. Referring to FIG. 6, one end of the primary coil 20 of a main transformer $T_M$ is connected to the collector of a main switching NPN transistor 21 whose emitter is connected to one end of a secondary coil of a pulse transformer $T_p$. The other end of the secondary coil of the pulse transformer $T_p$ is connected through a series-connected impedance circuit 22 to the base of the main switching transistor 21. The master control pulse generator 10 (which is substantially similar in construction and mode of operation to that shown in FIG. 4) is coupled to one input terminal of the logic circuit 11 (which is also substantially similar in construction and mode of operation to that shown in FIG. 4), to the input terminals of first and second delayed pulse generators 23 and 26 and to one input terminals of a first and a second pulse mixers 24 and 27. The output terminals of the first and second delayed pulse generators 23 and 26 are coupled to the other input terminals of the first and second pulse mixers 24 and 27. The output terminal of the first pulse mixer 24 is coupled to a pulse transformer drive circuit 25 which in turn is connected to the primary coil of the pulse transformer $T_p$. The output terminal of the second pulse mixer 27 is connected to one input terminal of the logic circuit 11.

In FIG. 6, the circuits 23 through 25 and the pulse transformer $T_p$ are provided so as to delay the timing for turning off the transistor 21 so that the time point when the transistor 3 is turned off can be synchronized with the time when the potential at the point 1A becomes zero or crosses the zero axis. The circuits 26 and 27 are provided so that when the time point at which the transistor 3 is turned off is faster than the time when the potential at the point 1A becomes zero or crosses the zero-axis, the turning-off time of the transistor 3 is delayed, whereby the time when the transistor 3 is turned off can be synchronized with the time when the potential at the point 1A becomes zero or crosses the zero-axis.

The first and second delayed pulse generators 23 and 26 generate the delayed pulses which rise in response to the fall of the pulse from the master control pulse generator 10 and fall after predetermined time intervals, respectively. The outputs from the first and second pulse mixers 24 and 27 rise in response to the rise of the master control pulse and fall in response to the fall of the respective delayed pulses from the first and second delayed pulse generators 23 and 26. The difference in time delay produced by the first and second time-delay circuits 23 and 26 is so utilized that the transistor 3 is turned off before the transistor 21 is turned off (or turned on) so as to prevent the flow of reverse current.

In addition to the above-described circuits, the third embodiment further includes the inductor 7, the transistor 3 which is a rectifying element, the auxiliary diode 12, the overvoltage protective circuit 13, the terminal voltage comparator 14, the logic circuit 11 for controlling the transistor 3 and the drive circuit 15 as with the first embodiment described with reference to FIG. 4. However, in the third embodiment the terminal voltage comparator 14 may be so designed and constructed as to detect only the point p at which $e_i = e_c$ when the input voltage $e_i$ is rising.

As described elsewhere, the driving pulse is applied to the transistor 3 at the time point p at which $e_i = e_c$ when the input voltage $e_i$ is rising so that the transistor 3 turns on or off a turn-on or turn-off time after the point p. The transistor 3 turns off in response to the pulse from the master control pulse generator 10 which falls before the main switching transistor driving pulse falls or rises. Thus, the transistor 3 turns off before the input voltage $e_i$ falls (or rises). However, due to the transient characteristics or properties of the transistors 3 and 21 during their turn-off times, a reverse voltage is applied to the transistor 3 when turned off so that the timing for turning off both the transistors 3 and 21 must be adjusted. These timing relationships will be described in more detail below in conjunction with a forward type DC-DC converter.

Referring to FIG. 7, (A) shows the master control pulse from the master control pulse generator 10; (B-1), the delayed pulse from the first delayed pulse generator 23; (B-2), the delayed pulse from the second delayed pulse generator 26; (C-1), the output pulse derived from the first pulse mixer 25; that is, the pulse for driving the pulse transformer $T_p$; (C-2), the output pulse derived from the second pulse mixer 27; (D), the switching voltage waveform of the main switching transistor 21; (E), the input voltage $e_i$ (solid line) to the transistor 3 by the switching operation of the main switching transistor 21 and the load (output) voltage $e_c$ (two-dot chain line) rectified by the transistor 3 and smoothed by a smoothing circuit (not shown); (F), the switching waveform of the transistor 3; and (G), the operating voltage waveform of the transistor 3 and the diode 12, the positive voltage being the forward falling voltage and the negative voltage being the reverse voltage applied to the transistor 3 and the diode 12, the reverse voltage having a different waveform depending upon the characteristics of the load.

The delayed pulses (B-1, B-2) from the time-delay circuits 23 and 26 rise in response to the fall of the master control pulse (A) at $T_s$ and fall after time intervals $T_q$ and $T_{q'}$, respectively. The output (C-1) from the first pulse mixer 25 rises in response to the fall of the master control pulse and falls at $T_q$ which is later than $T_s$ at which the master control pulse (A) falls. The output (C-2) from the second pulse mixer 27 rises in response to the rise of the master control pulse (A) and falls at $T_{q'}$ which is faster than $T_q$ but later than $T_s$. The main switching transistor 21 is turned on a turn-on time $t_{on}$ after the rise of the pulse transformer driving pulse (C-1) and is turned off a turn-off time $t_{off}$ after the fall of the pulse transformer driving pulse (C-1), whereby the voltage which is substantially synchronized with the on-off of the main switching transistor 21 is induced across the secondary coil of the main transformer $T_M$ as the input voltage $e_i$ (solid line at (E)) to the rectifying transistor 3. The rectifier output voltage $e_c$ (two-dot chain line) and the input voltage $e_i$ cross each other at the points p and q and the current flows through the transistor 3 and the diode 12 when the input voltage $e_i$ is higher than the output voltage $e_c$; that is, between the time points p and q. The terminal voltage comparator 14 detects the point p so that the output from the drive circuit rises to drive the transistor 3. The transistor 3 is turned on a turn-on time $\Delta t_1$ after the point p, remains on for a time interval $t_{on}$ and falls a turn-off time $\Delta t_{off}$ after the time $T_{q'}$ at which the output pulse (C-2) from the second pulse mixer 27 falls so that the driving pulse (for driving the transistor 3) drops. Thus, the transistor 3 is turned on a very short time $\Delta t_1$ after the input voltage $e_i (E)$ rises and crosses the output voltage $e_c$ and the input voltage $e_i$ crosses the output voltage $e_c$ at the point q a short time $\Delta t_x$ after the transistor 3 has been turned off and then falls. As a result, in the parallel-connected circuit consisting of the transistor 3 and the diode 12, the diode 12 is turned on at the moment when the rising input voltage $e_i$ crosses the output voltage $e_c$ at the point p and flows the current for $\Delta t_1$ until the transistor 3 is turned on. For $t_{on}$, the transistor 3 flows the current and after the transistor 3 has been turned off, the diode 12 flows the current for $\Delta t_x$. Therefore, as shown at (G), the forward voltage drop across the transistor-diode circuit is equal to the forward voltage drop $e_{f1}$ of the diode 12 for $\Delta t_1$ and $\Delta t_x$ and to the saturation voltage $e_{f2}$ between the collector and emitter of the transistor 3. Thus, during the short initial and terminating periods $\Delta t_1$ and $\Delta t_x$ during which the transistor has not yet turned on and off, the diode 12 is turned on as indicated by $P_a$ and $P_b$ at (G), whereby the synchronized rectification can be attained. As described elsewhere, therefore, the diode 12 must have a fast transition response and a sufficiently high peak current rating.

According to the experiments conducted by the inventors, it has been confirmed that when a parallel-connected circuit of a high-speed switching element and a diode which is sufficiently faster than the former is used, the front peak $P_a$ at (G) is almost negligible at the frequency between 1 kHz and 400 kHz, but the back peak $P_b$ is observed at and from considerably lower frequencies. The experiments also showed that when the time intervals $\Delta t_1$ and $\Delta t_x$ are suitably adjusted by adjusting the difference in time delay produced by the first and second time-delay circuits 23 and 26, the rectification efficiency may be considerably improved (higher than 6% at 150 kHz). However, the elimination of the time interval $\Delta t_x$; that is, the elimination of the width of the peak $P_b$ results in the drop in current efficiency.

A circuit (not shown) may be added to the third embodiment shown in FIG. 6 so that a pulse as shown at (H) may be produced in synchronism with the time interval $\Delta t_x$ (G), and another circuit (not shown) may be added to convert the duration of the pulse (H) into a DC voltage. The DC voltage is used in a negative feedback system in such a way that the transistor 3 may be turned off at a time point closer to the time point q. Then the time interval $\Delta t_x$ during which the diode 12 is turned on to flow the current after the transistor 3 has been turned off can be automatically shortened so that a more idealized synchronized rectification can be achieved.

So far the present invention has been described in conjunction with the NPN transistor 3 as a semiconductor active element, but it is to be understood that PNP transistors may be equally used. Furthermore, FETs and MOS FETs may be also used. In addition, the present invention may be equally applied to the choke-input type rectifiers.

In summary, according to the present invention, a semiconductor active element is used as a rectifying element and is connected in parallel with a diode. The active element is controlled in response to the voltage difference across the parallel combination of the active element and the diode. As a result, the synchronized rectification can be achieved in a simple manner and the damages to the active element by the reverse current and the overvoltage caused during the transition of the active element and the ever varying input and load conditions. Therefore, the characteristics of the semiconductor active elements can be fully utilized to attain a higher degree of efficiency. In addition, the synchronized rectifier in accordance with the present invention can operate at higher frequencies.

What is claimed is:

1. A rectifier for an AC input voltage, comprising:
   a parallel combination circuit of a semiconductor active rectifying element having a control terminal and a diode, said active element and said diode being connected in parallel in the same conduction direction;
   a terminal voltage comparator coupled to said parallel combination circuit for comparing the input voltage with the output voltage of said parallel combination; and
   a pulse control circuit comprising a master control pulse generator coupled to said terminal voltage comparator, an operational circuit and a drive circuit coupled to the control terminal of said semiconductor active element for controlling the same in response to the output from said master control pulse generator.

2. A rectifier for an AC input voltage, comprising:
   a parallel combination circuit of a semiconductor active rectifying element having a control terminal and a diode, said active element and said diode being connected in parallel in the same conduction direction;
   a terminal voltage comparator coupled to said parallel combination circuit for comparing the input voltage with the output voltage of said parallel combination; and
   a pulse control circuit comprising a master control pulse generator coupled to said terminal voltage comparator, an operational circuit and a drive circuit coupled to the control terminal of said semiconductor active element for controlling the same in response to the output from said master control pulse generator,
   said pulse control circuit being so designed and constructed that when said terminal voltage comparator detects the time at which the rising input voltage to said parallel combination circuit becomes equal to the rectified output voltage thereof, said pulse control circuit causes said semiconductor active element to turn on, and when said terminal voltage comparator detects the time at which the falling input voltage becomes equal to the output voltage, said pulse control circuit causes said semiconductor active element to turn off.

3. A rectifier for an AC input voltage, said rectifier being coupled to the secondary coil of a main transformer of a transformer isolation type DC-DC converter, said main transformer also having a primary coil, comprising:
   a parallel combination circuit of a semiconductor active rectifying element having a control terminal and a diode, said active element and said diode being connected in parallel in the same conduction direction;
   a terminal voltage comparator coupled to said parallel combination circuit for comparing the input voltage with the output voltage of said parallel combination;
   a pulse control circuit comprising a master control pulse generator coupled to said terminal voltage comparator, an operational circuit and a drive circuit coupled to the control terminal of said semiconductor active element for controlling the same in response to the output from said master control pulse generator, said pulse control circuit being so designed and constructed that when said terminal voltage comparator detects the time at which the rising input voltage to said parallel combination circuit becomes equal to the rectified output voltage thereof, said pulse control circuit causes said semiconductor active element to turn on;

a main switching transistor coupled to the primary coil of said main transformer of said DC-DC converter; and means responsive to the output pulses of said master control pulse generator for driving said main switching transistor so as to cause said semiconductor active element to turn off in a time interval shorter than the trailing edge of each of said pulses.

* * * * *